United States Patent [19]

Nomura et al.

[11] Patent Number: 4,641,881
[45] Date of Patent: Feb. 10, 1987

[54] SIDE DOOR HINGE MECHANISM IN MOTOR VEHICLE

[75] Inventors: Kazuhiro Nomura, Anjyo; Masayuki Nomura, Toyota, both of Japan

[73] Assignee: Toyota Jidosha Kabushiki Kaisha, Japan

[21] Appl. No.: 657,892

[22] Filed: Oct. 3, 1984

[30] Foreign Application Priority Data

Oct. 4, 1983 [JP] Japan .......................... 58-153917[U]

[51] Int. Cl.$^4$ .......................... B60J 5/04; B62D 25/04; E05D 15/28
[52] U.S. Cl. .................................... 296/202; 296/198; 296/146; 49/248; 16/370
[58] Field of Search .......................... 296/146, 149–151, 296/198, 202; 49/246, 248, 208; 16/302, 366, 370, 367

[56] References Cited

U.S. PATENT DOCUMENTS

| | | | |
|---|---|---|---|
| 1,762,629 | 6/1930 | Huesman | 296/146 |
| 3,006,683 | 10/1961 | Smith | 16/365 |
| 3,074,755 | 1/1963 | Peras | 16/370 |
| 3,095,600 | 7/1963 | Bretzner | 16/224 |
| 3,158,395 | 11/1964 | Smith | 296/148 |
| 3,275,370 | 9/1966 | Smith | 296/148 |
| 3,758,990 | 9/1973 | Balanos | 49/248 |

FOREIGN PATENT DOCUMENTS 962194 7/1964 United Kingdom ............... 49/246

Primary Examiner—Robert B. Reeves
Assistant Examiner—Dennis H. Pedder
Attorney, Agent, or Firm—Finnegan, Henderson, Farabow, Garrett & Dunner

[57] ABSTRACT

A hinge mechanism for a vehicle door including a support arm and a control arm, both which are pivotably connected between a mounting surface along the vehicle body and the door. The support arm is typically mounted forward of the control arm along the vehicle body. The door includes an end surface extending between an exterior and an interior of the door adjacent the mounting surface of the vehicle body. The end surface has a lower vertical section measuring a predetermined length and an upper inclined section. The mounting surface is aligned with the vertical section. The support arm extends along a substantial portion of the predetermined length of the vertical section of the door. The support arm is mounted to the mounting surface of the vehicle body by a first shaft and a second shaft pivotally mounts the door along the end surface thereof to the opposite end of the support arm. The control arm is pivotably mounted at opposite ends between the mounting surface and the door, allowing the control arm to pivot with the support arm. The vertical dimension of the control arm is small relative to the predetermined length of the lower vertical section of the door.

2 Claims, 3 Drawing Figures

SIDE DOOR HINGE MECHANISM IN MOTOR VEHICLE

BACKGROUND OF THE INVENTION

1. Field of the Invention

This invention relates to improvements in a side door hinge mechanism utilizing a quadric crank chain in a motor vehicle.

2. Description of Related Art

In most cases, the side door in a motor vehicle, such as a passenger car, is installed in a manner to be rotatable about a hinge affixed to a vehicle body for opening or closing. In order to allow an occupant of the motor vehicle to open or close the side door for getting in or out of the motor vehicle, a door opening angle corresponding to the total length of the side door is required. As a result, when free space adjacent side of the motor vehicle is small, it is oftentimes difficult for the occupant to get in or out of the vehicle because the side door cannot be opened sufficiently.

As noted in many publications such as U.S. Pat. Nos. 3,074,755 and 3,095,600, there have been proposed a side door hinge mechanism utilizing a quadric crank chain to overcome the above-mentioned difficulties.

Furthermore, as disclosed in U.S. patent appllication Ser. Nos. 611,149, 611,216 and 611,339, as shown in FIG. 1, a side door hinge mechanism in a motor vehicle having a quadric crank chain may include: a first rotary link 4 interconnecting a vehicle body 2 and a side door 3 and supported by rotary shafts 2A and 3A disposed on the vehicle body 2 and the side door 3, respectively; a second rotary link 5 interconnecting the vehicle body and the side door 3 and supported by rotary shafts 2B and 3B; a portion between the two rotary shafts 2A and 2B on the vehicle body 2; and another portion between the two rotary shafts 3A and 3B on the side door 3.

In the drawing, designated at 6 is a front pillar, 7 a front wheel and 8 a movable fender capable of rocking with the rotary link 4.

In the side door hinge mechanism utilizing the above-described quadric crank chain, the required space for the side door can be reduced while a desired space around feet of the occupant is maintained. As a result, even when the space at the side of the door is small, the occupant can open or close the side door 3 to get in or out of the vehicle.

However, when the first rotary link 4 and the second rotary link 5 are arranged as shown in FIG. 1, the rear rotary shaft 3B of the second rotary link 5, i.e. the rear link, is disposed at the substantially central portion in the longitudinal direction of the side door 3, and consequently, most of the second rotary link 5 is exposed to the compartment.

Consequently, such disadvantages are presented that the getting in or out of the vehicle by the occupant may be constricted by the second rotary link 5, which also detracts from the appearance of the interior of the compartment.

SUMMARY OF THE INVENTION

It is therefore the primary object of the present invention is to provide a side door hinge mechanism in a motor vehicle, wherein the rear rotary link does not prevent a passenger from getting in or out of the vehicle and wherein the appearance of the interior of the compartment is be deteriorated.

To this end, the present invention contemplates that, in a side door hinge mechanism in a motor vehicle, wherein a quadric crank chain comprises: a first rotary link or support arm interconnecting a vehicle body and a side door; a second rotary link or control arm intercennecting the vehicle body and the side door; a portion between the first and second rotary links on the vehicle body; and another portion between the first and second rotary links on the side door; pivotable shaft means of the first rotary link on the side door's side is disposed in the neighborhood of an end panel of the side door, the pivotable shaft means of the first rotary link proximate the vehicle body is disposed on the surface of the vehicle body adjacent the neighborhood of the aforesaid end panel, the pivotable shaft means of the first rotary link extend vertically between the end panel and the surface of the vehicle body, which are disposed adjacent to each other substantially in parallel.

To the above end, the present invention contemplates that said pivotable shaft means of the first rotary link on the vehicle body's side is secured to the outer side surface of a front pillar member.

To the above end, the present invention contemplates that said pivotable shaft means of the first rotary link on the side door is secured to an end panel of the side door.

To the above end, the present invention contemplates that said first rotary link is arranged substantially parallel to the side door at a position outwardly of the front pillar.

To the above end, the present invention contemplates that said second rotary link is made to be a control arm for controlling a moving path corresponding to the opening or closing the side door.

In this invention, the weight of the side door is mainly supported by the forward rotary link, whereby the rear rotary link exposed to the compartment mainly functions as a control arm for controlling the rotating path of the side door.

DETAILED DESCRIPTION OF THE PREFERRED EMBODIMENT

Description will be given of one embodiment of the present invention with reference to the drawings.

Figure 1:
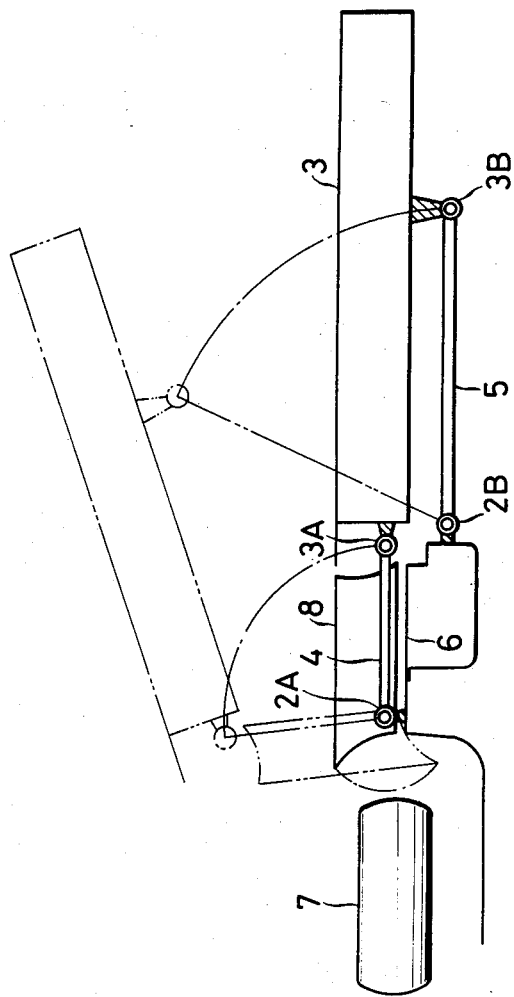
FIG. 1 is a schematic, plan and sectional view showing the conventional side door hinge mechanism utilizing the quadric crank chain in a motor vehicle.
Figure 2:
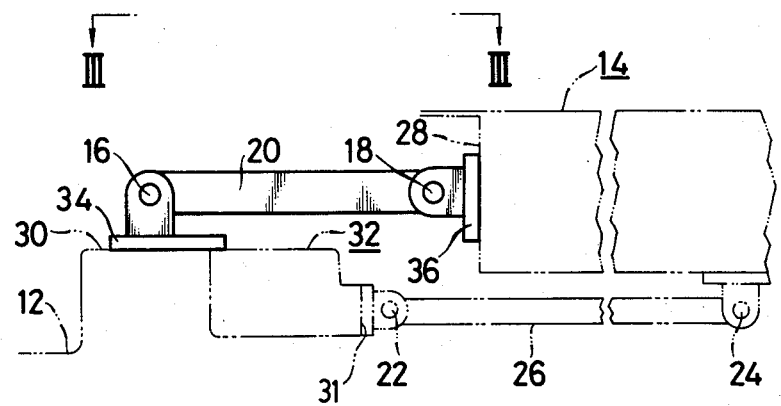
FIG. 2 is a schematic, plan and sectional view showing one embodiment of the side door hinge mechanism in a motor vehicle according to the present invention.
Figure 3:
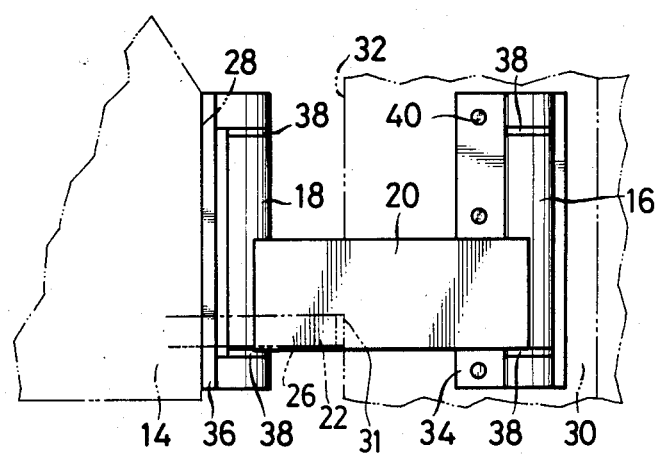
FIG. 3 is a sectional view taken along the line III—III in FIG. 2.

As shown in FIGS. 2 and 3, according to this embodiment, in a side door hinge mechanism in a motor vehicle, wherein a quadric crank chain comprises: a first rotary link or support arm 20 interconnecting a vehicle body 12 and a side door 14 through first and second rotary center shafts 16 and 18; a second rotary link or control arm 26 interconnecting the vehicle body 12 and the side door 3 through first and second rotary center shafts 22 and 24; a portion the first and second rotary links on the vehicle body 12; and another portion between first and second rotary links on the side door 14; the second rotary center shaft 18 of the first rotary link 20 on the side of the side door 14 is disposed on an end panel 28 of the side door 14, the first rotary center shaft 16 on the side of the vehicle body 12 is disposed on the surface 30 of the vehicle body adjacent the end panel 28, and these first and second rotary center shafts 16, 18 and the first rotary link 20 extend vertically between the end panel 28 and the surface 30 of the vehicle body 12, which are disposed adjacent to each other in the substantially vertical state.

More specifically, the first rotary center shaft 16 of the first rotary link 20 on the side of the vehicle body 12 is secured to the first mounting surface 30 of the vehicle body, which is the outer side surface of a pillar member defined along 32 the widthwise direction of the vehicle body. The pillar member 32 includes a pillar base 34. The second rotary center shaft 18 is secured to the end panel 28 of the side door 14 through a door base 36.

In the drawing, designated at 38 are bushings interposed between the rotary center shafts 16 and 18, and the pillar base 34 and the door base 36.

The pillar base 34 is formed on the first mounting surface 30 of the vehicle body 12 and extends as long as possible in the vertical direction. The door base 36 is also formed on the end panel 28 of the side door 14 to be as long as possible in the vertical direction.

More specifically, there are imposed such restrictions that the bottom portion of the end panel 28 is curved in the circularly arcuate manner at the lower forward portion of the side door 14, and the top portion of the end panel 28 is located adjacent the inclined forward side of the door frame, so that the end panel 28 cannot extend in the range of the total height of the side door 14 in the vertical direction.

Furthermore, there is also imposed a restriction to a door opening of the vehicle body 12 corresponding to the shape of the side door 14, particularly to the form of the front pillar 32 located adjacent the forward portion of the end panel 28. The rotary center shafts 16, 18 and the first rotary link 20 should be formed as long as possible within the aforesaid limits.

In the drawing, denoted at 40 are bolt holes for receiving bolts to mount the pillar base 34 onto the first mounting surface 30 of the vehicle body 12.

The door base 36 is solidly secured to the end panel 28 of the side door 14.

In this embodiment, the first and second rotary center shafts 16 and 18 extend as long as possible in the vertical direction, so that the first rotary link 20 can be elongated in the vertical direction to increase the rigidity thereof to a considerable extent.

As a consequence, the weight of the side door 14 is mainly supported by the first rotary link 20, and the second rotary link 26, which is secured to a second mounting surface 31 rearward of the first mounting surface 30, is formed into one having a small vertical cross section, such as shown in FIG. 3, so as to function as a control arm for mainly controlling the moving path of opening or closing the side door 14. As shown in FIG. 2, when the side door 14 is closed, the first and second rotary links 20, 26, which extend from substantially perpendicular surfaces on the pillar member 32, are in parallel.

As the result, such disadvantages are alleviated that the second rotary link 26 conflicts with the occupant getting in or out of the vehicle and the appearance of the interior of the compartment is not deteriorated. Furthermore, in this embodiment, the rotary center shafts 16 and 18 are elongated in the vertical direction, whereby the mounting pitch is increased for bolting up or welding the pillar base 34 and door base 36 to the first mounting surface 30 of the vehicle body 12 and the end panel 28 in order to mount the rotary center shafts 16 and 18 to the first mounting surface 30 of the vehicle body 12 and the end panel 28 of the side door 14, so that a load acting on the mounted surface can be reduced and pressures acting on the surfaces of the bushings 38 can be reduced, the busings being interposed between the pillar base 34, door base 36 and the first and second rotary center shafts 16, 18.

Additionally, in the above embodiment, the first rotary center shaft 16 on the vehicle body's side is secured to the surface 30 of the vehicle body as being the outer side surface of the front pillar 32, which is relative to the widthwise direction of the vehicle. The second rotary center shaft 18 on the side door's side is secured to the end panel 28 of the side door 14, however, the present invention need not necessarily be limited to this, and any mounting positions may be adopted provided the second rotary center shaft 18 is mounted to the end panel 28 of the side door 14 on the proximal end's side thereof or thereabouts. The first rotary center shaft 16 is mounted to the surface of the front pillar 32, which is opposed to the end panel 28 or any other member mounted to the surface of the vehicle body opposed to the end panel 28, and these first and second rotary center shafts 16 and 18 are disposed in parallel to the substantially vertical direction.

What is claimed is:

1. A hinge mechanism for a vehicle door comprising:
   a vehicle body including means extending vertically along said vehicle body for mounting the door to said vehicle body, the door having an end surface extending between an exterior and an interior of the door proximate said mounting means, said end surface having a lower vertical section measuring a predetermined length and an upper inclined section, said mounting means having a first mounting surface aligned with said vertical section and a second mounting surface, said mounting means including a pillar member extending vertically along said vehicle body, said first mounting surface being positioned along an outer side of said pillar member and said second mounting surface being located on said pillar member rearward of said first mounting surface;
   support means extending between said vertical section and said first mounting surface for providing primary support for the door, said support means including a support arm and first pivot means for pivotally connecting said support arm to said first mounting surface and to said end surface, wherein said first pivot means includes first shaft means for pivotally mounting said support arm on said first mounting surface and second shaft means for pivotally mounting the door along said end surface to a portion of said support arm opposite said first shaft means; and
   control means extending between the door and said second mounting surface for guiding the door when the door is opened and closed, said control means including a control arm and second pivot means for pivotally connecting said control arm to said second mounting surface and to the door to enable said control arm to pivot with said support arm, when said door is opened and closed, the vertical dimension of said control arm being small relative to said support arm.

2. The hinge mechanism defined in claim 1, wherein said support arm and said control arm are aligned substantially in parallel when said door is closed, so that said control arm does not interfere with a seated occupant.

* * * * *